United States Patent
Lee (10) Patent No.: US 7,236,774 B2
(45) Date of Patent: Jun. 26, 2007

(54) APPARATUS AND METHOD FOR DISPLAYING INFORMATION OF CALLING PARTNER DURING CALL WAITING IN PORTABLE WIRELESS TERMINAL

(75) Inventor: Jong-Hoon Lee, Kunpo-si (KR)

(73) Assignee: Samsung Electronics Co., Ltd. (KR)

( * ) Notice: Subject to any disclaimer, the term of this patent is extended or adjusted under 35 U.S.C. 154(b) by 29 days.

(21) Appl. No.: 11/151,327

(22) Filed: Jun. 13, 2005

(65) Prior Publication Data

US 2006/0073817 A1 Apr. 6, 2006

(30) Foreign Application Priority Data

Oct. 1, 2004 (KR) .................... 10-2004-0078151

(51) Int. Cl.
*H04M 3/42* (2006.01)

(52) U.S. Cl. .................. 455/417; 455/466; 455/435.1; 455/422.1; 455/415; 455/412.1; 455/412.2; 455/413; 379/142.08; 379/142.01

(58) Field of Classification Search ............... 455/466, 455/435.1, 422.1, 415, 412.1, 412.2, 413, 455/417; 379/142.08, 142.01
See application file for complete search history.

(56) References Cited

U.S. PATENT DOCUMENTS

2003/0100295 A1* 5/2003 Sakai et al. ................. 455/415
2004/0203776 A1* 10/2004 Jun ........................... 455/435.1
2005/0094788 A1* 5/2005 Lipton et al. ........... 379/142.01
2005/0254635 A1* 11/2005 Koretsky et al. ....... 379/142.08
2006/0268750 A1* 11/2006 Weiner ........................ 370/260

FOREIGN PATENT DOCUMENTS

| KR | 2004-0046338 | 6/2004 |
|----|--------------|--------|
| KR | 2004-0094271 | 11/2004 |

* cited by examiner

*Primary Examiner*—Joseph Feild
*Assistant Examiner*—Khai Nguyen
(74) *Attorney, Agent, or Firm*—The Farrell Law Firm (57) ABSTRACT

Disclosed is a system for displaying on calling partner terminal during call waiting information on a wireless terminal received via an Internet server through which a user stores a call connection community screen, with a message containing a call connection community screen is received via the Internet server and displayed for a calling partner during a call waiting in a wireless terminal. A predetermined field of the message is checked when a message is received from the messaging server in a call waiting status. If the predetermined field has a specific set value, the call connection community screen is extracted from the message and displayed on a display window, with the call connection community screen containing information of the calling partner. User individuality can be visually expressed to the calling partner during the call waiting and the call waiting time can be more efficiently utilized through the interactive screen.

17 Claims, 7 Drawing Sheets

APPARATUS AND METHOD FOR DISPLAYING INFORMATION OF CALLING PARTNER DURING CALL WAITING IN PORTABLE WIRELESS TERMINAL

PRIORITY

This application claims priority under 35 U.S.C. § 119 to an application entitled "Apparatus And Method For Displaying Information Of Calling Partner During Call Waiting In Portable Wireless Terminal" filed in the Korean Intellectual Property Office on Oct. 1, 2004 and assigned Ser. No. 2004-0078151, the contents of which are incorporated herein by reference.

BACKGROUND OF THE INVENTION

1. Field of the Invention

The present invention relates to an apparatus and method for displaying information of a calling partner during call waiting in a portable wireless terminal, and more particularly, to an apparatus and method for receiving and displaying information previously registered by a calling partner, in a message form, during call waiting.

2. Background of the Prior Art

As electronic and communication industries advance, portable wireless terminals are being more widely distributed, and functions of the terminals are being diversified to meet user's demands. Meanwhile, the terminals tend to be of smaller-size and more lightweight. Further, the emergence of a portable wireless terminal with a built-in digital camera allows desired objects to be easily captured and stored. Also, the captured images can be uploaded to a wireless Internet server and transmitted to other terminals.

In the portable wireless terminal, a Short Message Service (SMS) is widely used. Meanwhile, SMS is evolving into a Multimedia Messaging Service (MMS) to allow transmission of a message having an attached image. That is, while SMS could originally only transmit characters, it can now transmit a variety of images, such as photographs or animation.

In general, for an outgoing voice call, a calling party hears a call connection sound (music or voice message), which is stored by a called party, until a called terminal responds to the voice call and the call is actually connected. Here, the duration of time until the call is actually connected after the outgoing voice call is made will be referred to as a call waiting time, i.e. "call waiting". At this point, the calling terminal counts and displays a call duration and the called terminal displays a caller ID. That is, although a voice service capable of expressing the called party's personality during the call waiting is supported, such display service is uniform and does not allow various demands of a user to be met. Further, since the called terminal can recognize the calling party only through caller ID, there is a demand for more varied display services.

That is, if a display service capable of expressing the calling partner's personality during the call waiting is supported, it may be an additional service comparable to the call connection sound. Specifically, such an additional service may be useful in cases such as when a called party cannot answer the phone because he or she is on urgent business, at an important meeting, absent, on vacation, on a business trip, or in the hospital. If such a situation can be determined through a call waiting screen, allowing wasted time due to the repetitive callings to be prevented. In addition, if a called party's emotion (i.e. angry, depressed, happy, etc.) can be known through the call waiting screen, the calling party can more adaptively cope with the called party's emotion during or when initiating a telephone conversation. Specifically, such a call waiting screen can be used as a medium through which the calling party can be reminded of birthdays, meeting places, etc. Further, it can be used as a medium for expressing delicate emotions to intimate friends can be expressed with characters, photographs, pictures, etc.

As described above, in conventional systems, the calling terminal in call waiting status will simply display the call duration, and the called terminal will display only the caller ID. Accordingly, both the calling terminal and the called terminal simply display only such basic information. The present invention allows for visual display of the calling partner's personality, like the call connection sound, during the call waiting.

SUMMARY OF THE INVENTION

Accordingly, the present invention is directed to an apparatus and method for displaying information of a calling partner during a call waiting in a portable wireless terminal to substantially obviate one or more problems due to limitations and disadvantages of the related art.

An object of the present invention is to provide an apparatus and method for displaying information of a calling partner during call waiting in a portable wireless terminal.

Another object of the present invention is to provide an apparatus and method for receiving and displaying information of a calling partner through an MMS (Multimedia Messaging Service) during call waiting in a portable wireless terminal.

A further another aspect of the present invention is to provide an apparatus and method for receiving and displaying information, which is previously registered in an Internet server by a calling partner, through an MMS (Multimedia Messaging Service) during call waiting in a portable wireless terminal.

A still further another aspect of the present invention is to provide an apparatus and method for receiving and displaying a call connection community screen, which is set by a calling partner, during call waiting in a portable wireless terminal.

To achieve the object and other advantages, according to one aspect of the present invention, there is provided a method for displaying the information of a calling partner during call waiting in a wireless terminal in a system, which includes an Internet server through which a user stores a call connection community screen in a database so as to display an information on a wireless terminal of a calling partner during a call waiting; and a messaging server for creating and transmitting a message to a corresponding wireless terminal, the message containing the call connection community screen of the Internet server. The method includes checking a predetermined field of the message when a message is received from the messaging server in a call waiting status; and, if the predetermined field has a specific set value, extracting the call connection community screen from the message and displaying the extracted call connection community screen on a display window, the call connection community screen containing an information of the calling partner.

The call connection community screen may display at least one of a calling partner's schedule, emotion information for close friends, an advertisement image, an event image, D-day of an event and matter for congratulation and condolence, the number of calls, a calling partner's popularity and bio-rhythm, an absence/presence, and photograph.

The call connection community screen may be a personal homepage which operates in the Internet server.

The call connection community screen may contain a link information which makes it possible to request additional information to the Internet server.

The method may further include the step of storing the displayed call connection community screen in a predetermined region of a memory according to a user's selection.

The message containing the call connection community screen may be any one of an MMS (Multimedia Messaging Service) message, an EMS (Enhanced Messaging Service) message, an SMS (Short Message Service) message, and an LMS (Long Message Service) message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are provided in the accompanying drawings. For clarity, well known features of the subject of the invention are not included in the following detailed description.

Hereinafter, an apparatus and method for receiving and displaying previously registered information during a call waiting time (i.e. "call waiting") in a portable wireless terminal will be described. For the convenience of explanation, the information of the calling partner displayed during the call waiting will be referred to as a "call connection community screen".

A network configuration to which the present invention can be applied will be schematically described with reference to FIG. 1. The network configuration will be recognized as a general mobile communication system. Although the names of the elements are different, the network configuration is common in IS-95A/B, GSM, IS-2000, WCDMA, UMTS, and similar systems.

Figure 1:
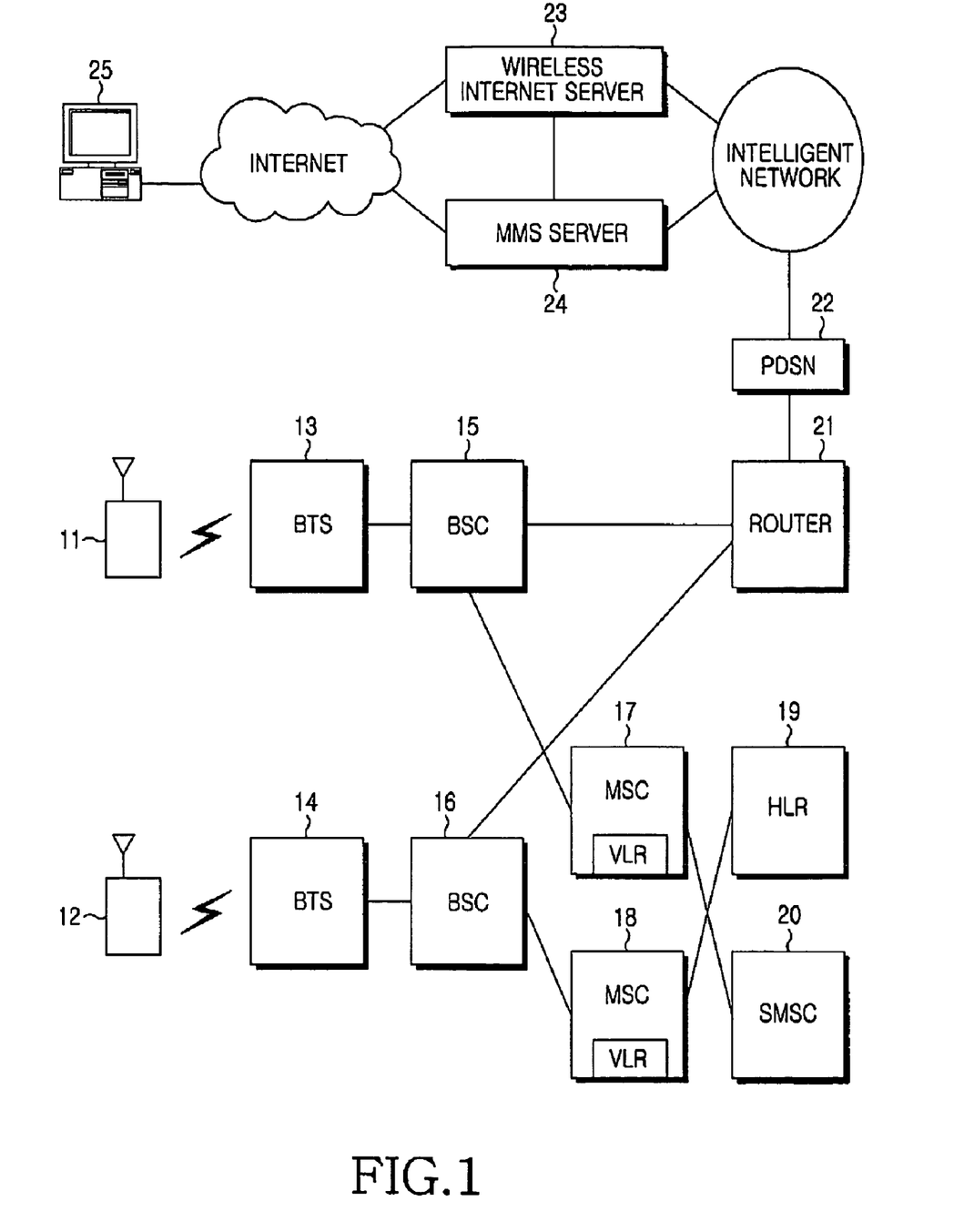
FIG. 1 is a schematic view of a network configuration according to the present invention.

FIG. 1 is a schematic view of a network configuration according to the present invention.

Referring to FIG. 1, a network according to the present invention includes wireless terminals 11 and 12, Base Station Subsystems (BTSs) 13 and 14, Base Station Controllers (BSCs) 15 and 16, Mobile Switching Centers (MSCs) 17 and 18, a Home Location Register (HLR) 19, a Short Message Service Center (SMSC) 20, a router 21, a Packet Data Service Node (PDSN) 22, a wireless Internet server 23, a Multimedia Messaging Service (MMS) server 24, and a personal computer (PC) 25.

The wireless terminals 11 and 12 represent portable terminals that are carried by users. Here, it is assumed that the wireless terminal 11 is a calling terminal and the wireless terminal 12 is a called terminal. The BTSs 13 and 14 perform a wired/wireless switching function to connect the wireless terminals 11 and 12 to the BSCs 15 and 16, respectively. The BSC 15 is disposed between the BTS 13 and the MSC 17 and the BSC 16 is disposed between the BTS 14 and the MSC 18. The BSCs 15 and 16 manage and control the BTSs 13 and 14, respectively. The MSCs 17 and 18 have Visitor Location Registers (VLRs) to perform location registration of the wireless terminals 11 and 12, respectively. Also, the MSCs 17 and 18 perform a call set-up and a call processing between calling partners for voice communication and data communication of the wireless terminals 11 and 12. The HLR 19 stores and manages subscriber information (i.e. subscriber's name and address etc.), information of the additional services requested by the subscriber, and location information of wireless terminals. The SMSC 20 performs call processing for call and message transmission between the wireless terminals.

The router 21 performs a data switching to process a network connection between the mobile communication network and the PDSN 22 connected to an Internet Protocol (IP) network. The PDSN 22 is connected to the wireless Internet server 23 and the MMS server 24 through an intelligent network and is connected to the mobile communication network through the router 21. Also, the PDSN 22 interfaces communication data between the mobile communication network and an external IP network and performs routing and tunneling of packet data for the IP network.

The wireless Internet server 23 represents a server to provide Internet-based content. For example, NATE of SK Telecom and MAGICN of KT Freetel are the representative wireless Internet serivces in Korea. As is well known, the wireless Internet server 23 provides services to both the wired Internet and the wireless Internet. For example, Hypertext Transfer Protocol (HTTP) is used for the interface with the wireless Internet, and Wireless Application Protocol (WAP) is used for the interface with the wireless Internet.

In this embodiment, the wireless Internet server 23 provides contents for registering a call connection community screen and registers a call connection community screen in a database. The call connection community screen is to be transmitted to the calling partner during a call waiting according to the requests from the wireless terminals 11 and 12 or the PC 25. When a message requesting transmission of the call connection community screen is received, the wireless Internet server 23 extracts a caller ID and a called ID from the message. Then, the wireless Internet server 23 accesses the database using the respective IDs and reads out the call connection community screens registered by the calling party and the called party. Also, the wireless Internet server 23 requests transmission of the call connection community screen to the corresponding terminals by transmitting a message containing the information of the read-out call connection community screen to the MMS server 24.

The MMS sever 24 performs a call processing for transmitting multimedia messages, such as a moving picture, an image, an audio and a flash, between the wireless terminals. The MMS server 24 converts the information from the wireless Internet server 23 into MMS message based on a predetermined specification and transmits the MMS message to the corresponding wireless terminal. That is, the MMS message containing the call connection community screen registered by the calling party is transmitted to the called terminal 12 and the MMS message containing the call connection community screen registered by the called party is transmitted to the calling terminal 11. The calling terminal 11 extracts the call connection community screen from the MMS message received during the call waiting and displays it on a display window. The called terminal 12 extracts the call connection community screen from the MMS message received during the call waiting and displays it on a display window. Meanwhile, the MMS server 24 records a specific set value (or identification code) on a predetermined field of the message in order to distinguish the message containing the call connection community screen from a general message. Therefore, if receiving the message having a predetermined field to which a specific value is set, the wireless terminals 11 and 12 determine that the received message contains the call connection community screen, so that they directly display the call connection community screen of the message without storing it in a message box.

The PC 25 has a built-in web browser based on HTTP protocol such that the PC 25 can exchange multimedia data on a web via the Internet network. The multimedia includes a character, an audio, an image, a moving picture, a flash, and so on. That is, the PC user can use a variety of contents after he or she connects to a website of the wireless Internet server 23 through the web browser. The PC user connects to the wireless Internet server 23 and registers the call connection community screen to be transmitted to the calling partner during the call waiting.

An overall operation of the network configuration shown in FIG. 1 will be described later with reference to FIG. 4.

Figure 2:
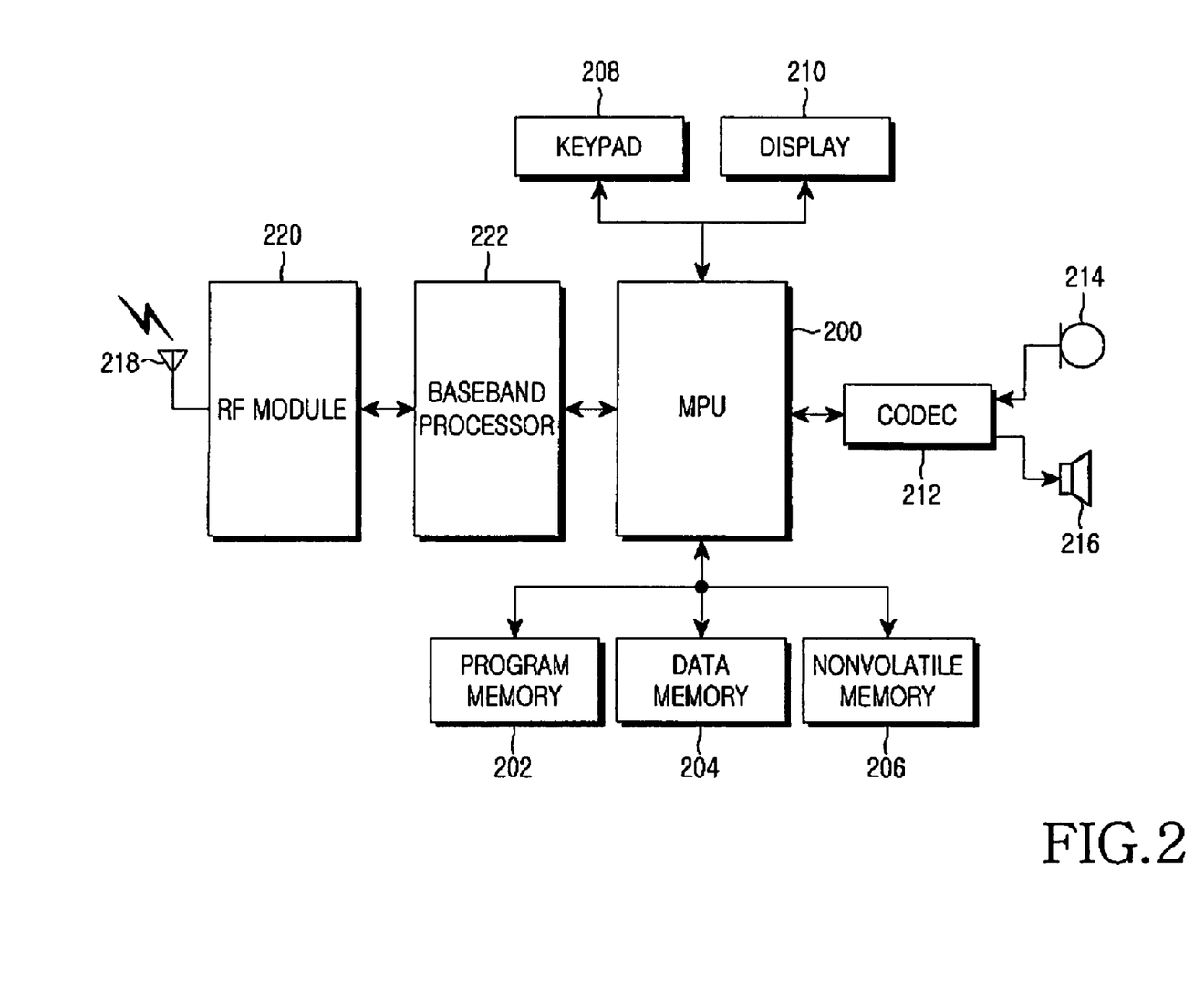
FIG. 2 is a block diagram of a portable wireless terminal according to an embodiment of the present invention.

FIG. 2 is a block diagram of a portable wireless terminal according to an embodiment of the present invention. The portable wireless terminal includes a cellular phone, a Personal Communication System (PCS), a Personal Data Assistant (PDA), an international mobile communication-2000 (MIT-2000) terminal, a 4G (OFDM: Orthogonal Frequency Division Multiplexing) terminal, and the like. A description will now be made with a general structure of the above terminals.

Referring to FIG. 2, a Microcomputer Processing Unit (MPU) 200 controls an overall operation of the terminal. For example, the MPU 200 processes and controls voice communication and data communication. In addition to the typical functions, the MPU 200 processes a function to display on the display window the information of the calling partner received in a message form during the call waiting. A description about the typical process and control operation of the MPU 200 will be omitted.

A memory includes a program memory 202, a data memory 204 and a nonvolatile memory 206. The program memory 202 stores a program for controlling an overall operation of the terminal. A flash memory may be used as the program memory. The data memory 204 temporarily stores data created during the operation of the terminal. A Random Access Memory (RAM) may be used as the data memory. The nonvolatile memory 206 stores system parameter and other data (phone number, message, image data, etc.). An Electrically Erasable and Programmable Read Only Memory (EEPROM) may be used as the nonvolatile memory.

A key pad 208 includes numeric keys of digits 0–9 and a plurality of function keys, such as a MENU key, a CANCEL (DELETE) key, an ENTER key, a TALK key, an END key, an Internet connection key and navigation keys (▲/▼/◄/►). The key pad 208 provides a key input data to the MPU 200. The key input data corresponds to a key that is pressed by the user. A display device 210 displays status information (or indicator) of the terminal, numerals and characters, moving pictures and still pictures, and the like. A color Liquid Crystal Display (LCD) may be used as the display device 210.

A coder-decoder (CODEC) 212 connected to the MPU 200, a speaker 216 and a microphone 214 connect to the CODEC 212 for audio input/output for use in voice communication. The MPU 200 produces PCM data and the CODEC 212 converts the PCM data into analog audio signals. The analog audio signals are outputted through the speaker 216. Also, the CODEC 212 converts audio signals received through the microphone 214 into PCM data and provides the PCM data to the MPU 200.

A Radio Frequency (RF) module 220 drops a frequency of an RF signal received through an antenna 218 and provides the RF signal to a baseband processor 222. Also, the RF module 220 increases a frequency of a baseband signal provided from the baseband processor 222 and transmits the baseband signal through the antenna 218. The baseband processor 222 processes the baseband signals that are transmitted/received between the RF module 220 and the MPU 200. For example, in the case of the data transmission, the baseband processor 222 performs channel coding and spreading transmitting data. In the case of the data reception, the baseband processor 222 performs despreading and channel decoding for receiving data.

Figure 3:
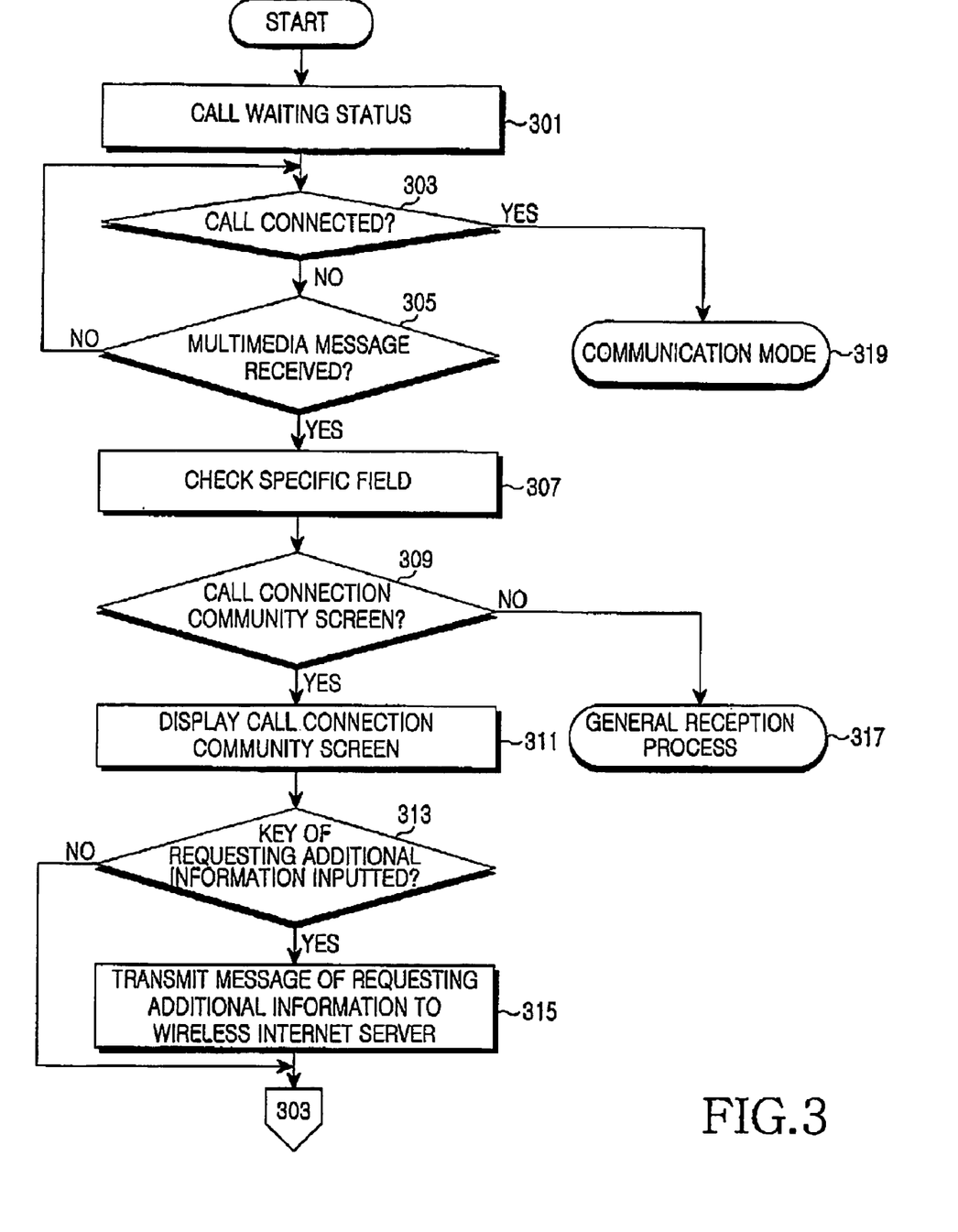
FIG. 3 is a flowchart illustrating a method for displaying information of a calling partner during call waiting according to an embodiment of the present invention, in which information is received in a message form in a portable wireless terminal.

FIG. 3 is a flowchart illustrating a method for displaying information of a calling partner received in a message form during a call waiting in a portable wireless terminal according to an embodiment of the present invention.

Referring to FIG. 3, if a call is outgoing or incoming, the MPU 200 enters a call waiting status (Step 301). For an call incoming, the MPU 200 typically outputs a control signal for output of a bell sound previously set by the user by the speaker 216.

Then, the MPU 200 checks whether the call is connected (Step 303). That is, the MPU 200 checks whether the called party presses a call key. If the call is connected, the MPU 200 performs a communication mode (Step 319).

If the call is not connected, the MPU 200 checks whether a multimedia message is received (Step 305). The multimedia message may be a Multimedia Messaging Service (MMS) message, an Enhanced Messaging Service (EMS) message and the like, which can include the transmitted image. Also, the multimedia message may include a Short Message Service (SMS) message and a Long Message Service (LMS) message because the SMS message and the LMS message can express the image by an emoticon.

If the multimedia message is not received, the MPU 200 returns to Step 303. Meanwhile, if the multimedia message is received, the MPU 200 checks a predetermined field of the received message (Step 307).

Then, the MPU 200 checks whether the predetermined field has a specific set value (Step 309). That is, the MPU 200 checks whether the received message contains the call connection community screen. If the call connection community screen is not contained in the received message, the MPU 200 performs a general message reception process (Step 317).

If the call connection community screen is contained in the received message, the MPU 200 extracts the call connection community screen from the message and displays it on a display window (Step 311). Here, the call connection community screen may include, for example, the calling partner's schedule, emotion and close friends, images showing a matter for congratulation and condolence, D-day of an event matter for congratulation and condolence, the number of calls, scores of popularity, scores of kindness, bio-rhythm, absence/presence, photograph information, and the like. Meanwhile, the call connection community screen may include buttons that can request other additional information. That is, if the user selects the buttons displayed on the display window, he or she can request other additional information registered by the calling partner.

After displaying the call connection community screen, the MPU 200 checks whether a key for requesting other additional information is inputted (Step 313). If there is no key input for requesting the additional information, the MPU 200 returns to Step 303. If there is the key input for requesting the additional information, the MPU 200 creates and transmits an additional information request message to the wireless Internet server (S315) and then returns to Step 303.

In this embodiment, a storage of the call connection community screen has not been described in detail. However, since the received call connection community screen can include important information (e.g., the matter for congratulation and condolence) of the calling partner, the call connection community screen may be stored during the call waiting or after the call termination, depending on the user's selection.

An overall operation of the present invention will be described with reference to the messages exchanged between the components of the network.

Figure 4:
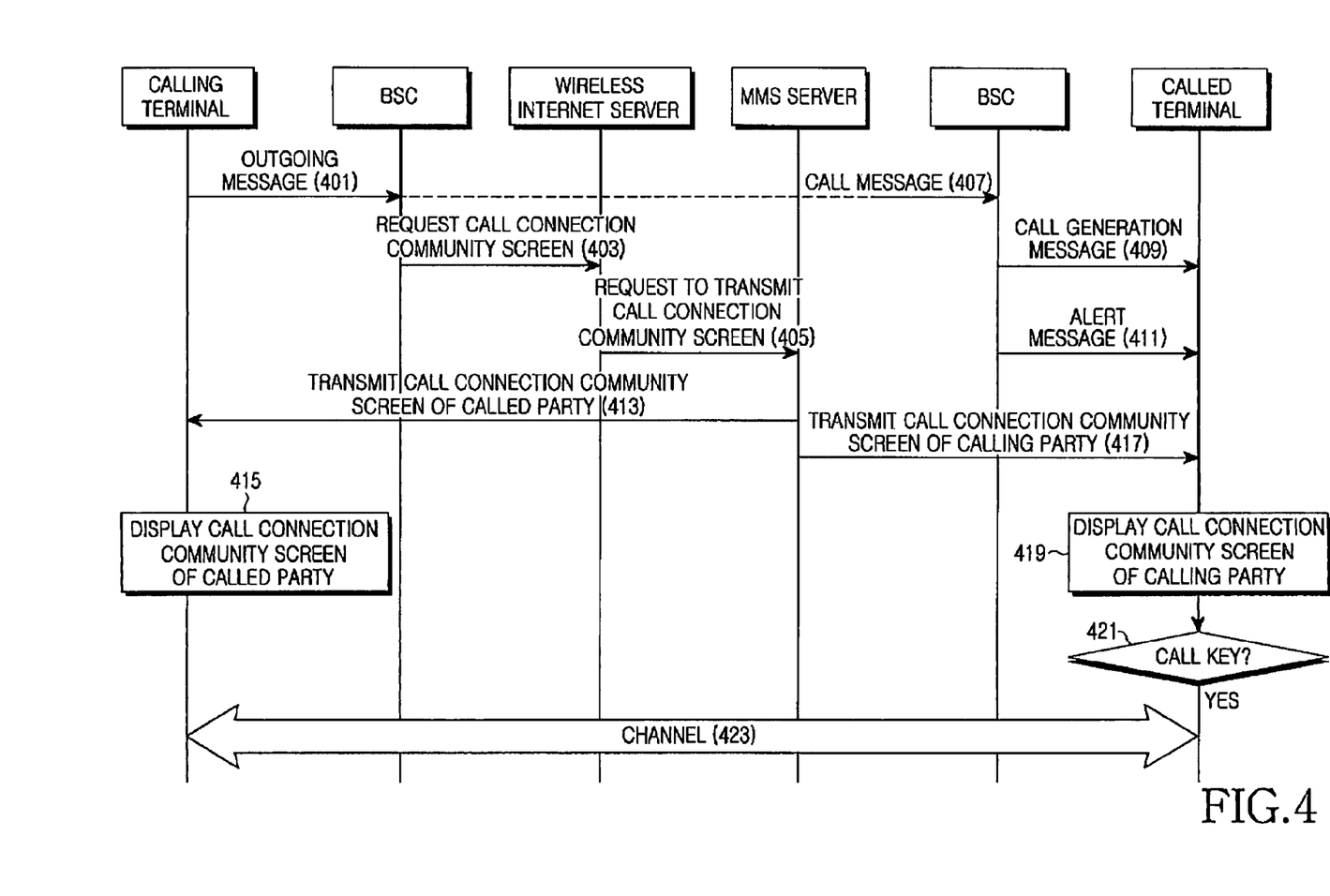
FIG. 4 is a flowchart illustrating a method for providing information of a calling partner to two terminals during call waiting according to the present invention.

FIG. 4 is a flowchart illustrating a method for providing information of a calling partner to two terminals during call waiting according to an embodiment of the present invention.

Referring to FIG. 4, if the send button is inputted, the calling terminal 11 transmits an outgoing message to the BSC 15 (Step 401). Here, the outgoing message contains a caller ID and a called ID. The BSC 15 transmits a call of the calling terminal 11 to the BSC 16 of the calling partner in response to the outgoing message. At this point, the BSC 16 receives a call message (PageReq) (Step 407). In the reception of the call message, the BSC 16 transmits a call generation message (PCH_GenPage) to the called terminal 12 (Step 409). Then, if a service connection is completed through signaling negotiation between the BSC 16 and the called terminal 12, the BSC 16 transmits an alert message (FTCH_AlertWithInfo), containing the caller ID, to the called terminal 12 (Step 411). At this point, the called terminal 12 outputs a bell sound that is set by the user.

Meanwhile, in the reception of the outgoing message, the BSC 15 extracts the caller ID and the called ID from the outgoing message and transmits a message of requesting the call connection community screen to the wireless Internet server 23 (Step 403). The message contains the caller ID and the called ID. The wireless Internet server 23 extracts the caller ID and the called ID from the request message, accesses the database using the respective IDs and reads out the call connection community screens registered by the calling party and the called party (Step 405). Then, the wireless Internet server 23 requests the transmission of the call connection community screens to the corresponding terminal by transmitting a message including the information of the read-out call connection community screens to the MMS server 24.

The MMS sever 24 converts the information from the wireless Internet server 23 into an MMS message based on a predetermined specification and transmits the MMS message to the corresponding wireless terminal (Step 413). First, the MMS message containing the call connection community screen registered by the called party is transmitted to the calling terminal 11. Then, the calling terminal 11 extracts the call connection community screen from the MMS message and displays it on the display window (Step 415).

Meanwhile, the MMS server 24 transmits to the called terminal 12 the MMS message containing the call connection community screen registered by the calling party (Step 417). Then, the called terminal 12 extracts the call connection community screen from the MMS message and displays it on the display window (Step 419). If the called party presses the call key (Step 421), a channel is established between the calling terminal 11 and the called terminal 12 (Step 423).

Figure 5A:
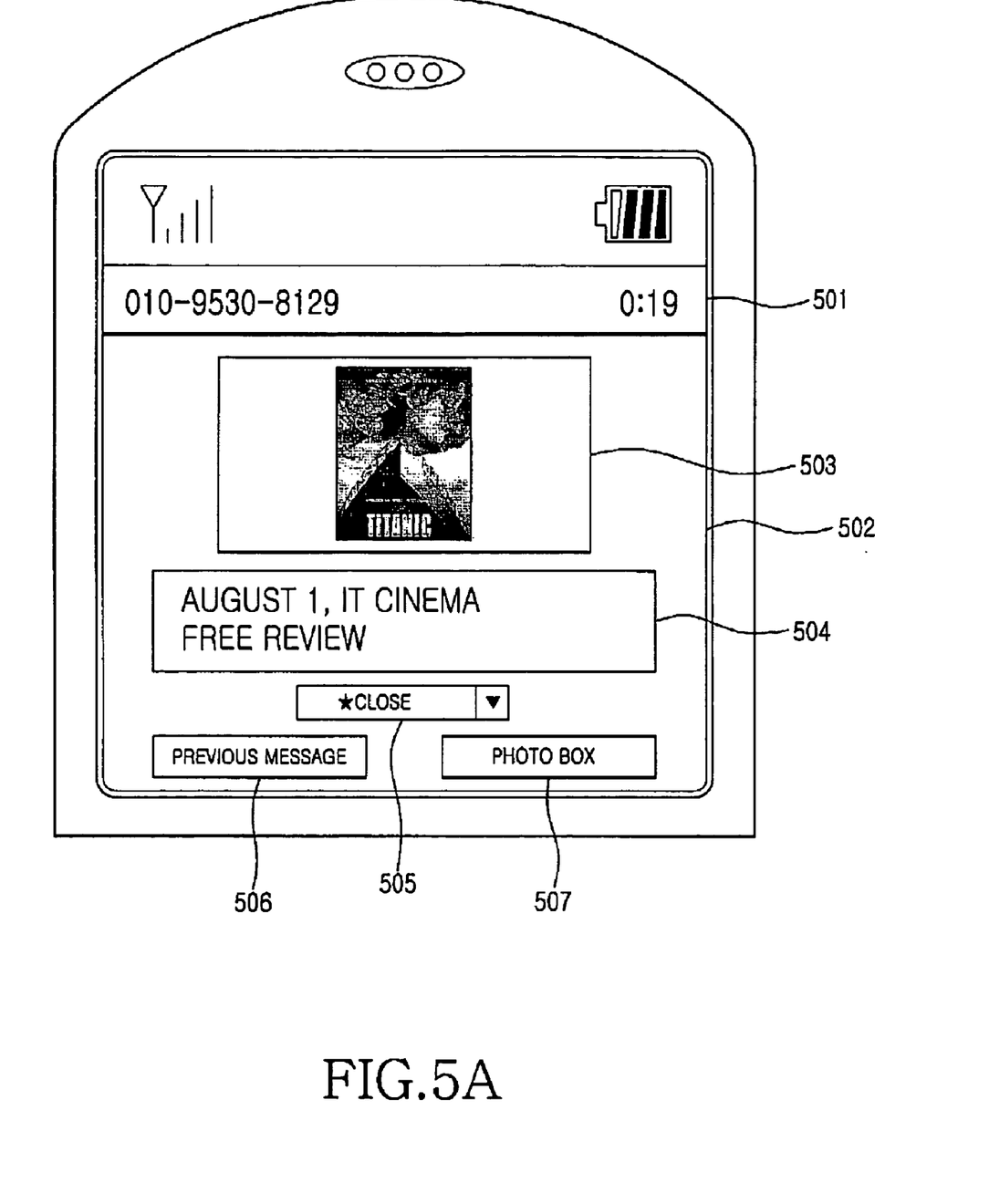
FIGS. 5A to 5C are exemplary views illustrating call connection community screens according to an embodiment of the present invention.
Figure 5B:
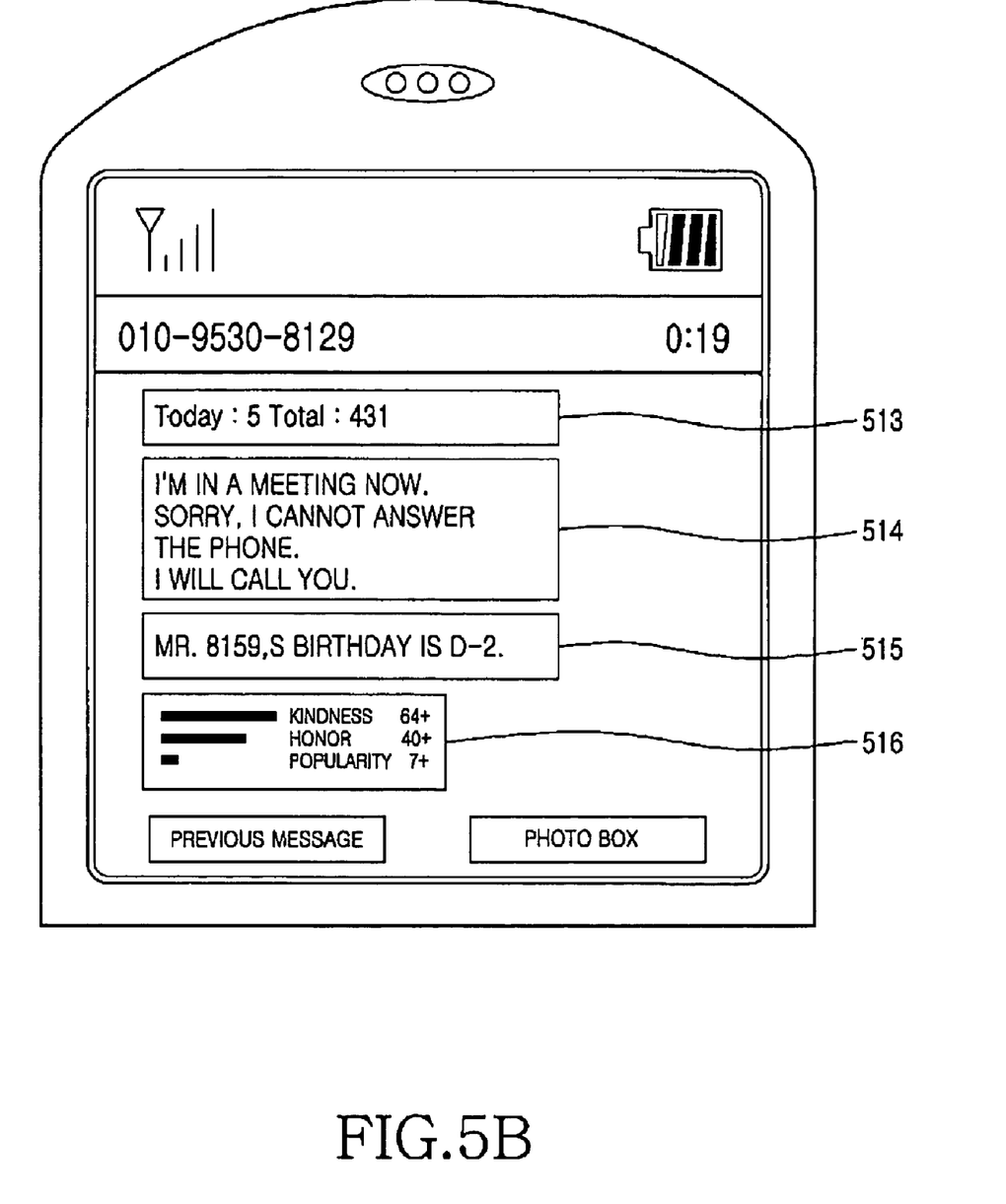
Figure 5C:
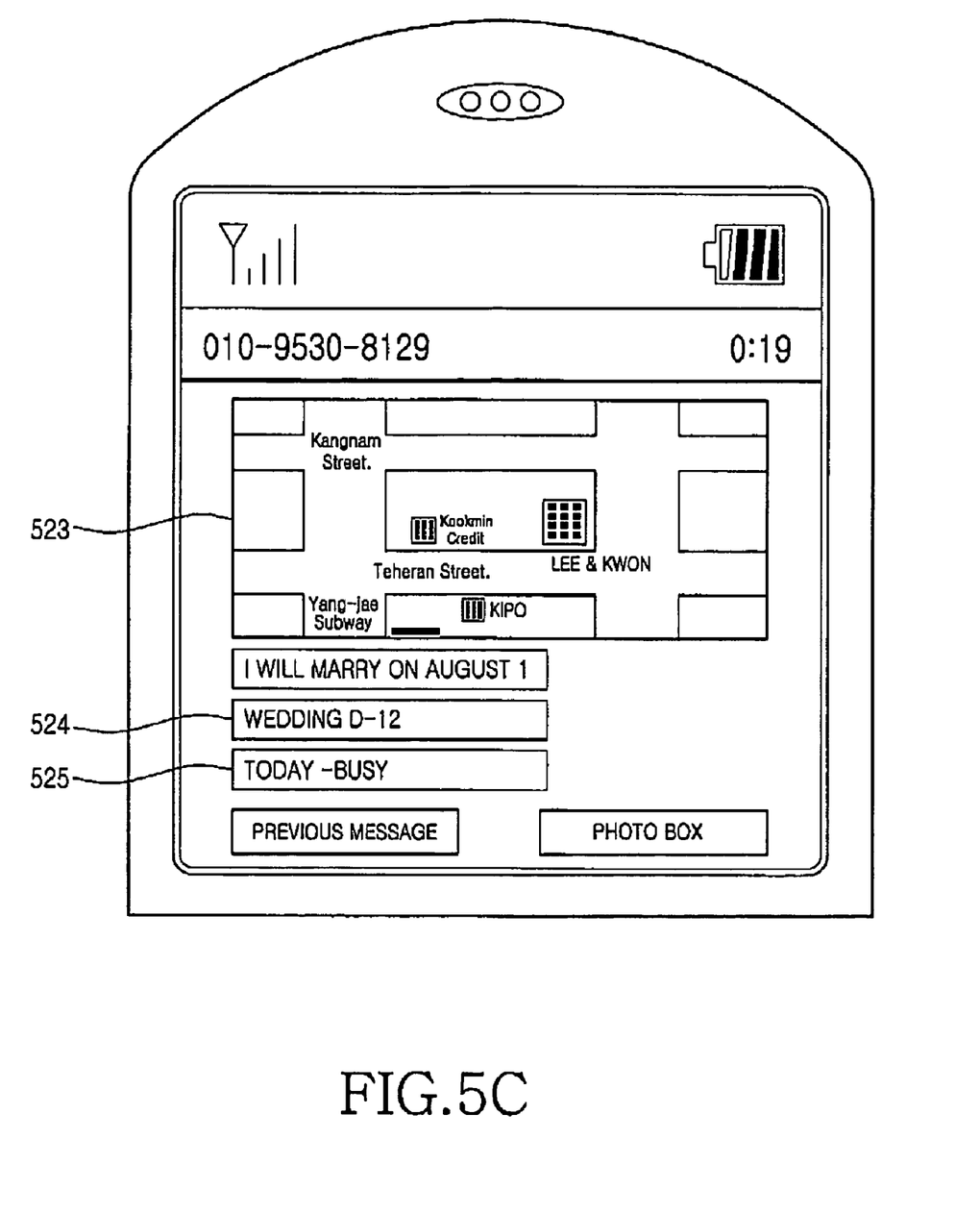

FIGS. 5A to 5C are exemplary views illustrating call connection community screens according to an embodiment of the present invention.

Referring to FIG. 5A, a User Interface (UI) is largely divided into two regions. An upper region 501 is a native user interface and displays the phone number of the calling partner and the call duration (or connected duration), as in conventional systems. Here, the call duration is updated within the terminal itself. A lower region 502 displays the information that is previously registered in the wireless Internet server. In more detail, the lower region 502 displays an advertisement image 503, a text box 504 that explains the image 503, a combo box 505 that can show information about the calling partner's close friends, a button 506 that can show a previously registered information, and a button 507 that can show photographs registered in the server by the calling partner. Since the text box 504, the combo box 505 and the buttons 506 and 507 contain link information, the user can request other additional information to the server by using the link information. In this case, the server transmits the corresponding information to the MMS server in response to the request, and the MMS server converts the information into a message based on a specific specification and transmits it to the terminal again. In this manner, the terminal user can check a variety of information uploaded on the server by the calling partner, just as the terminal user connects to the web page of the calling partner.

Referring to FIG. 5B, a User Interface (UI) is largely divided into two regions. An upper region is a native user interface and displays the phone number of the calling partner and the call duration, as in conventional systems. In a lower region, a first box 513 displays the number of calls by the calling partner (today's number of calls and total number of calls), and a second box 514 displays a text message (e.g., on vacation until X day, in a meeting now, in absence, on business trip, etc.) which is set by the user. A third box 515 displays D-day of matters for congratulation and condolence, and a fourth box 516 displays graphs about the popularity and bio-rhythm of the user. Meanwhile, like the case of FIG. 5A, a button which can see the previously registered information and a button which can see the photographs registered in the server by the calling partner are displayed at the lowermost region. Here, the contents displayed on the fourth box 516 are calculated based on a predetermined standard by the server. That is, it can be said that this service is not the registered information but it is provided from the server.

Referring to FIG. 5C, a User Interface (UI) is largely divided into two regions. An upper region is a native user interface and displays the phone number of the calling partner and the call duration, as in conventional systems. In a lower region, a first box 523 displays a map image that can provide notice a meeting place and the like, and a second box 524 displays D-day of matters for congratulation and condolence. A third box 525 displays emotional status (e.g., happy, tired, etc.) of the calling partner via icon or the like. Meanwhile, like the above examples, a button for viewing the previously registered information and a button for viewing the photographs registered in the server by the calling partner are displayed at the lowermost region. Accordingly, if the meeting place and the like are noticed through the call connection screen, the user himself or herself need not otherwise proved notice the meeting place and the like to everybody.

As described above, the call connection community screen according to the present invention can contain the calling partner's schedule, emotional information for close friends, advertisement, events, image of the matter for congratulation and condolence, D-day of event and a matter for congratulation and condolence, the number of calls, the calling partner's popularity and bio-rhythm, the absence/presence, the photographs, and the like. In another embodiment, his or her own homepage (e.g., mini homepage) operating in a wireless Internet can be used as the call connection community screen.

According to the present invention, it is possible to obtain previous knowledge about the calling partner before the call is connected, thereby improving a communication effect. Also, if the call connection community screen is developed as an additional service with which the call connection sound can be replaced with color, allowing service providers to make a profit from the additional service. Further, the individuality can be visually expressed to the calling partner during the call waiting and the call waiting time can be more efficiently utilized through the interactive screen.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations thereof that are within the appended claims will be apparent to those skilled in the art.

What is claimed is:

1. A method for displaying information of a calling partner during call waiting in a wireless terminal, in which a user stores a registered call connection community screen in a database for display of information on a wireless terminal of a calling partner during call waiting; and a messaging server creates and transmits a message to a corresponding wireless terminal, the message containing the call connection community screen from an Internet server, the method comprising the steps:

checking a predetermined message field when a message is received from the messaging server in a call waiting status; and if the predetermined field has a specific set value, extracting the call connection community screen from the message and displaying the extracted call connection community screen on a display window, the call connection community screen containing information of the calling partner.

2. The method of claim 1, wherein the call connection community screen displays one of a calling partner's schedule, an emoticon, an advertisement image, an event image, D-day of an event and matter for congratulation and condolence, a number of calls, a calling partner's popularity and bio-rhythm, an absence/presence message, and a photograph.

3. The method of claim 2, wherein the emoticon is only available to close friends.

4. The method of claim 1, wherein the call connection community screen is a personal homepage which operates via the Internet server.

5. The method of claim 1, wherein the call connection community screen contains link information for requesting additional information from the Internet server.

6. The method of claim 1, further comprising the step of:
storing the displayed call connection community screen in a predetermined region of a memory according to a user's selection.

7. The method of claim 1, further comprising the step of:
storing the received message in a message box, if the specific field lacks the specific set value.

8. The method of claim 1, wherein the message containing the call connection community screen is one of an MMS (Multimedia Messaging Service) message, an EMS (Enhanced Messaging Service) message, an SMS (Short Message Service) message, and an LMS (Long Message Service) message.

9. An apparatus for displaying information of a calling partner during call waiting in a wireless terminal, in which a user stores a registered call connection community screen in a database so as to display an information on a wireless terminal of a calling partner during call waiting, the apparatus comprising:

a BSC (Base Station Controller) for transmitting a message requesting a call connection community screen when an outgoing call is detected;

an Internet server for extracting a caller IDentification (ID) and a called ID from the request message, accessing a database using the caller and called IDs, reading out call connection community screens registered by a calling party and a called party, and transmitting a message containing the read-out call connection community screens to a messaging server;

the messaging server for extracting the call connection community screens of the calling party and the called party from the message transmitted by the Internet server, creating a message containing the call connection community screen of the called party and transmitting the message to a calling terminal, and creating a message containing the call connection community screen of the calling party and transmitting the message to a called terminal;

the calling terminal for extracting the call connection community screen containing information of the called party from the message transmitted by the messaging server and displaying the call connection community screen on a display window during call waiting; and the called terminal for extracting the call connection community screen containing information of the calling party from the message transmitted by the messaging server and displaying the call connection community screen on a display window during call waiting.

10. The apparatus of claim 9, wherein the call connection community screen displays an emoticon and a photograph.

11. The apparatus of claim 10, wherein the emoticon is only available to close friends.

12. The apparatus of claim 9, wherein the call connection community screen is a personal homepage which operates via the Internet server.

13. The apparatus of claim 9, wherein the message containing the call connection community screen is any one of an MMS (Multimedia Messaging Service) message, an EMS (Enhanced Messaging Service) message, an SMS (Short Message Service) message, and an LMS (Long Message Service) message.

14. The apparatus of claim 9, wherein the call connection community screen contains a link information which makes it possible to request additional information to the Internet server.

15. The apparatus of claim 9, wherein the call connection community screen displays a user's schedule, an advertisement image, and an event image.

16. The apparatus of claim 9, wherein the call connection community screen displays an emoticon, a user's popularity and bio-rhythm, an absence/presence, and a photograph.

17. The apparatus of claim 9, wherein the call connection community screen displays an advertisement image, an event image, D-day of an event and matter for congratulation and condolence, and a photograph.

* * * * *